US010748697B2

(12) United States Patent
Madsen et al.

(10) Patent No.: US 10,748,697 B2
(45) Date of Patent: Aug. 18, 2020

(54) EMBEDDED SOLENOID TRANSFORMER FOR POWER CONVERSION

(71) Applicant: Danmarks Tekniske Universitet, Kgs. Lyngby (DK)

(72) Inventors: Mickey P. Madsen, Kgs. Lyngby (DK); Jakob Døllner Mønster, Copenhagen (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 262 days.

(21) Appl. No.: 15/103,239

(22) PCT Filed: Dec. 22, 2014

(86) PCT No.: PCT/EP2014/079037
§ 371 (c)(1),
(2) Date: Jun. 9, 2016

(87) PCT Pub. No.: WO2015/092070
PCT Pub. Date: Jun. 25, 2015

(65) Prior Publication Data
US 2016/0307690 A1  Oct. 20, 2016

(30) Foreign Application Priority Data
Dec. 20, 2013 (EP) ................................ 13198912

(51) Int. Cl.
*H01F 5/00* (2006.01)
*H01F 27/28* (2006.01)
(Continued)

(52) U.S. Cl.
CPC ......... *H01F 27/2804* (2013.01); *H01F 19/00* (2013.01); *H01F 27/29* (2013.01); *H02M 3/33523* (2013.01); *H01F 2027/2809* (2013.01)

(58) Field of Classification Search
USPC .................................... 336/200, 232, 233, 83
See application file for complete search history.

(56) References Cited

U.S. PATENT DOCUMENTS 6,031,445 A * 2/2000 Marty ................. H01F 27/2804
257/E21.022
2002/0002771 A1 1/2002 Lin
(Continued)

FOREIGN PATENT DOCUMENTS

| DE | 43 06 416 A1 | 9/1994 |
| JP | 2000-223316 A | 8/2000 |
| WO | WO 2009/128047 A1 | 10/2009 |

OTHER PUBLICATIONS

Choi, Byungcho et al., "Design, Analysis, and Implementation of a Low-Profile Resonant DC-to-DC Converter Using PCB Transformer" IEICE Transactions on Communications, Aug. 2004, pp. 2335-2341, vol. E87-B, No. 8.
(Continued)

*Primary Examiner* — Elvin G Enad
*Assistant Examiner* — Kazi S Hossain
(74) *Attorney, Agent, or Firm* — Knobbe Martens Olson & Bear, LLP

(57) ABSTRACT

A resonant power converter for operation in the radio frequency range, preferably in the VHF, comprises at least one PCB-embedded transformer. The transformer is configured for radio frequency operation and comprises a printed circuit board defining a horizontal plane, the printed circuit board comprising at least two horizontal conductive layers separated by an isolating layer, a first embedded solenoid forming a primary winding of the transformer and a second embedded solenoid being arranged parallel to the first solenoid and forming a secondary winding of the transformer, wherein the first and second embedded solenoids are formed in the conductive layers of the printed circuit board, wherein
(Continued)

each full turn of an embedded solenoid has a horizontal top portion formed in an upper conductive layer, a horizontal bottom portion formed in a lower conductive layer, and two vertical side portions formed by vias extending between the upper and the lower conducting layers.

20 Claims, 8 Drawing Sheets

(51) Int. Cl.
*H01F 19/00* (2006.01)
*H01F 27/29* (2006.01)
*H02M 3/335* (2006.01)

(56) References Cited

U.S. PATENT DOCUMENTS

| | | | |
|---|---|---|---|
| 2002/0105406 A1* | 8/2002 | Liu | H01F 17/0006 336/200 |
| 2004/0100805 A1 | 5/2004 | Wei et al. | |
| 2004/0196132 A1 | 10/2004 | Yu et al. | |
| 2005/0073384 A1* | 4/2005 | Matsutani | H01F 17/06 336/200 |
| 2006/0081397 A1 | 4/2006 | Enchi et al. | |
| 2007/0128821 A1* | 6/2007 | Lee | H01F 19/04 438/381 |
| 2007/0171680 A1* | 7/2007 | Perreault | H02M 1/34 363/16 |
| 2009/0237899 A1 | 9/2009 | Furnival | |
| 2010/0052630 A1 | 3/2010 | Chen | |
| 2013/0119511 A1* | 5/2013 | Shi | H01F 27/2804 257/531 |
| 2013/0293336 A1* | 11/2013 | Lo | H01F 27/2804 336/200 |
| 2013/0335182 A1 | 12/2013 | Zybura et al. | |

OTHER PUBLICATIONS

Hui, S.Y.R., et al., "Coreless PCB-based transformers for Power MOSFET/IGBT Gate Drive Circuits" PESC Record 97: 28th Annual IEEE Power Electronics Specialists Conference, St. Louis, Jun. 22-27, 1997, pp. 1171-1176.

Kovacevic, Milovan et al., "VHF Series-Input Parallel-Output Interleaved Self-Oscillating Resonant SEPIC Converter" 2013 IEEE Energy Conversion Congress and Exposition, IEEE, Sep. 15, 2013, pp. 2052-2056.

Madsen, Mickey et al., "Printed Circuit Board Embedded Inductors for Very High Frequency Switch-Mode Power Supplies" 2013 IEEE ECCE Asia Downunder, IEEE, Jun. 3, 2013, pp. 1071-1078.

International Search Report for PCT/EP2014/079037 dated Mar. 27, 2015.

* cited by examiner

EMBEDDED SOLENOID TRANSFORMER FOR POWER CONVERSION

CROSS REFERENCE TO RELATED APPLICATIONS

This application is a U.S. National Phase Application of PCT International Application Number PCT/EP2014/079037, filed on Dec. 22, 2014, designating the United States of America and published in the English language, which is an International Application of and claims the benefit of priority to European Patent Application No. 13198912.1, filed on Dec. 20, 2013. The disclosures of the above-referenced applications are hereby expressly incorporated by reference in their entireties.

The present invention relates in one aspect to a transformer for radio frequency operation comprising a printed circuit board defining a horizontal plane, the printed circuit board comprising at least two horizontal conductive layers separated by an isolating layer, a first solenoid forming a primary winding of the transformer and a second solenoid being arranged parallel to the first solenoid and forming a secondary winding of the transformer.

According to a further aspect, the invention relates to a power converter operating at radio frequencies and comprising a transformer of the above-mentioned kind. More particularly, the invention relates to a resonant DC-DC converter operating at radio frequencies and comprising a transformer of the above-mentioned kind.

BACKGROUND OF THE INVENTION

Over many years there has been a constant need for small, cheap and efficient power supplies. This has led to the development of Switch-Mode Power Supplies (SMPS). The size of modern power supplies are mainly governed by the passive energy storing elements, which scales inversely with the switching frequency. Therefore, much development has been devoted to increasing switching frequencies. Commercially available converters today switch at frequencies up to several megahertz and can have efficiencies of more than 95%. The reason for not increasing the switching frequency further and thereby reaching even higher power densities are switching losses. One way of addressing this issue has been the use of resonant Radio Frequency (RF) amplifiers (inverters) combined with a rectifier for DC-DC converters. With this type of converters, SMPSs with switching frequencies in the Very High Frequency range (VHF, 30-300 MHz) have been designed with efficiencies up to approx. 90%. By operating the DC-DC converters at radio frequencies, or even at VHF frequencies, it is possible to reduce the size, and thereby also price, of the passive energy storing elements significantly. However, the inductive components, and in particular the power transformers, are still the largest components in the circuits. Therefore, there is a need for small and highly efficient transformers.

Object of the present invention is therefore to provide a transformer for radio frequency operation, with a small and efficient design that can be reliably produced at low cost.

DEFINITIONS

Throughout the present text, the term "conductive" refers to electrically conductive. The term "isolating" refers to electrically isolating. The term "coupled" is to be understood as a galvanically separated electromagnetic coupling, which is to be distinguished from electrically "connected" referring to a galvanic connection through a conductive material.

Depending on the particular use, a transformer may sometimes also be referred to as coupled inductors. The term "transformer" usually refers to devices adapted for power transfer. Transformers require a high level of coupling to avoid inhibitive losses. The term "coupled inductors" is usually employed when referring to devices adapted for signal transfer, where a lower level of coupling may still be useful or maybe even desirable for a particular application. However, the topologies of a transformer and of coupled inductors cannot be distinguished in practice. Therefore, throughout the present application, the terms transformer and "coupled inductors" are treated as interchangeable.

When arranged in a circuit, a transformer may be operated in different configurations depending on the way the transformer is connected into the circuit. When referring to an "isolating transformer", it is to be understood that a given transformer is connected in an isolating configuration. Accordingly, when referring to an "autotransformer" it is to be understood that the transformer is connected in an autotransformer configuration.

When referring to power converters, this includes any of a DC-DC converter, an AC-DC converter, an AC-AC converter, and a DC-AC converter.

The term "horizontal" refers to directions parallel to the plane of the printed circuit board (PCB). The term "vertical" refers to directions perpendicular to the horizontal plane defined by the printed circuit board, wherein a first vertical direction points in an upward direction, and a second vertical direction opposite to the first vertical direction points in a downward direction, wherein a vector pointing from a "lower" element to an "upper" element has an upward pointing vertical component.

The term "parallel" covers geometries with a lateral offset as well as coinciding geometries without offset, i.e. when referring to parallel axes coinciding axes are also covered. In this context, the orientation of a solenoid is determined by the direction of its longitudinal axis. Any angle between solenoids including the angle zero, i.e. a configuration with parallel solenoids, is thus to be understood as the angle between the respective longitudinal axes of the solenoids.

SUMMARY OF THE INVENTION

According to a first aspect, the object of the invention is achieved by a resonant power converter for operation in the radio frequency range, preferably in the VHF, the power converter comprising at least one transformer, wherein the at least one transformer comprises
- a printed circuit board defining a horizontal plane, the printed circuit board comprising at least two horizontal conductive layers separated by an isolating layer,
- a first embedded solenoid forming a primary winding of the transformer and
- a second embedded solenoid being arranged parallel to the first solenoid and forming a secondary winding of the transformer,
wherein the first and second embedded solenoids are formed in the conductive layers of the printed circuit board, wherein each full turn of an embedded solenoid has a horizontal top portion formed in an upper conductive layer, a horizontal bottom portion formed in a lower conductive layer, and two vertical side portions formed by vias extending between the upper and the lower conducting layers. In general, a single winding formed in this way may already be considered as a PCB-embedded solenoid.

Thereby an efficient power converter is achieved with a small size, which can be produced in an automated manner with high reproducibility and at low cost. The power converter may be any of a DC-DC converter, an AC-DC converter, an AC-AC converter, and a DC-AC converter.

Further according to one embodiment of the power converter, at least one of the transformers is arranged as an isolating transformer between an input side and an output side. In such a configuration, the power passed through the converter is transferred from an input side of the converter through the isolating transformer to the output side of the converter. Therefore, a good coupling between the first and second solenoids is required to avoid excessive losses, such as a coupling factor k above 0.6 or preferably above 0.8.

Further according to one embodiment, the power converter is a resonant DC-DC converter. In this context the term DC can refer to a slowly varying voltage. In the context of a switch mode power converter, the term "DC" may thus be considered fulfilled as long as the variation of the DC-voltage level is slow as compared to the switching frequency of the power converter. When building a resonant DC-DC converter, a good coupling between the first and second solenoids is desired in order to achieve an efficient resonant operation of the power converter. This is achieved by using a PCB-embedded transformer of the solenoid type as disclosed in the present application. Advantageously, this may be such a PCB-embedded transformer with bifilar interleaved first and second solenoids, wherein single turns of the first solenoid alternate with single turns of the second solenoid. Alternatively, this may advantageously also be a PCB-embedded transformer formed in a multilayer PCB, such as a four-layer PCB, wherein the second solenoid is arranged inside the first solenoid as seen in a cross-sectional plane perpendicular to a longitudinal axis of the solenoids (or vice versa).

Furthermore, by using a PCB-embedded transformer of the solenoid type as disclosed in the present application for coupling first and second solenoids in a resonant DC-DC power converter, a particularly small form factor, low profile (i.e. a low vertical dimension), low weight, and low production cost is achievable. Furthermore, using a PCB-embedded transformer in a power converter as described in the present invention has the advantage that the foot-print of the transformer may be shaped as desired by the circuit designer. This freedom of design gives a considerable flexibility to the circuit designer and is particularly relevant when the available space is a critical parameter.

The above-mentioned advantages are particularly useful, for example when integrating a power converter into LED-lighting devices or flat-screen displays, due to the very stringent spatial limitations in such lighting applications. In particular the limitations on the vertical dimensions (low profile) of the converters are very demanding in these applications. These challenges can be met by a power converter including PCB-embedded transformer as disclosed by the present invention. The above-mentioned advantages are also useful, for example when building charging devices as e.g. used in many mobile consumer devices, due to the reduced weight and an enhanced mechanical stability that may be achieved thereby.

Further according to one embodiment of the power converter, a switching frequency on the input side is at least 10 MHz, preferably at least 20 MHz, more preferably at least 30 MHz. This operation range of the power converter is particularly advantageous for the resonant DC-DC converter.

Operating in this frequency range facilitates the use of embedded transformers in a particularly advantageous way for designing efficient power converters. The choice of operating at frequencies of at least 10 MHz, at least 20 Mhz, or even at least 30 MHz synergistically adds to the above-mentioned advantages of a low overall form factor, low profile, low weight, freedom of design, etc. For example, the possibility of an efficient coreless transformer design of the embedded PCB-transformer configured for operation in the VHF as discussed in this application avoids losses in a core material; the low capacitance needed when operating at these frequencies makes it possible to use ceramic capacitors which have a much longer lifespan than electrolytic capacitors; at these frequencies a rapid transient response and a small component form factor can be achieved; the smaller size of the components required leads to a reduced cost of components and a cheaper assembly, thereby reducing the overall production cost for the power converter. In particular, designing the power converter as a resonant power converter facilitates a particularly efficient operation at the above recited switching frequencies.

Further according to some embodiments of the resonant power converter, the transformer is provided according to one of the advantageous embodiments as detailed in the following.

According to a broader aspect, the object of the invention is achieved by a transformer for radio frequency operation, the transformer comprising
 a printed circuit board defining a horizontal plane, the printed circuit board comprising at least two horizontal conductive layers separated by an isolating layer,
 a first embedded solenoid forming a primary winding of the transformer and
 a second embedded solenoid being arranged parallel to the first solenoid and forming a secondary winding of the transformer,
wherein the embedded solenoids are formed in the conductive layers of the printed circuit board, wherein each full turn of an embedded solenoid has a horizontal top portion formed in an upper conductive layer, a horizontal bottom portion formed in a lower conductive layer, and two vertical side portions formed by conductive vias extending between the upper and the lower conducting layers.

By using solenoids embedded in a PCB in a transformer arrangement, an embedded solenoid transformer is obtained. An embedded solenoid transformer has several advantages over other configurations as further detailed in the following.

The printed circuit board is stratified with a vertical stacking direction, i.e. different layers of the printed circuit board are oriented horizontal and parallel to each other. At least one isolating layer usually also forms the carrier layer. In a multilayer PCB, the stacked layers may in combination form a carrier layer.

The embedded solenoids are helical coils wound around a horizontal axis that defines a longitudinal direction of the solenoid. In a preferred embodiment, each coil is formed by a series of traces of conductive material patterned into the horizontal conductive layers of the PCB. The traces are electrically connected in series by means of vias penetrating the isolating layer in a vertical direction to form a horizontal coil embedded in the PCB. Top portions of the coil that are formed by traces in an upper conductive layer alternate with bottom portions that are formed by traces in a lower conductive layer. Starting with a top portion, a full turn of a coil is thus formed, by the top portion, followed by a downward via, a bottom portion, and an upward via. Each of the upward and downward vias may also be formed by multiple vias that are coupled in parallel, thereby lowering the total resistance of the turn.

The embedded solenoid transformer is easy to scale by merely adjusting the layout of the traces forming the top and bottom portions and the positions of the vias.

The embedded solenoids have an essentially rectangular cross-section as seen in a cross-sectional plane perpendicular to the longitudinal axis. Typically, the rectangular cross-section has a slab-like shape with a flat aspect ratio where the vertical dimension is smaller than the horizontal dimension.

The first and second solenoids are placed next to each other, with partial overlap, or with full overlap, and are inductively coupled. The coupling may be external, i.e. through the external field of the solenoids, and/or internal, i.e. through the internal field of the solenoids.

Advantageously according to a preferred embodiment, the transformer is "coreless", i.e. the solenoids are not coupled through a magnetically conducting material. The term "coreless" is thus to be understood as to also include embodiments where the transformer is coupled through a magnetically non-permeable material, such as a typical substrate material used for producing printed circuit board. For example, the embedded solenoids may be wound about, and thus filled with, such magnetically non-permeable material. Such coreless embodiments are in the following also referred to as "air-core". Such coreless transformer arrangements have the advantage that they are easier to produce than an embedded transformer with core-based coupling. Furthermore, such coreless embodiments have the advantage that they are not subject to dissipation due to losses in a core material.

Advantageously according to a preferred embodiment, the first and second solenoids are embedded on the same PCB. Thereby, additional assembly steps can be avoided, which may carry the inherent risk of misalignment and reduced precision. As a consequence, reliable and reproducible high-volume production of the embedded transformer can be achieved.

In the most general configuration, the longitudinal axes of the first and second solenoids may have an arbitrary angle with respect to each other. However, in order to achieve an appropriate coupling, in particular in an air-core configuration, the longitudinal axes of the first and second solenoids are arranged parallel to each other. Furthermore, the first and second solenoids may have an essentially rectangular footprint on the PCB as seen in projection in a horizontal plane. Owing to that rectangular footprint, the embedded transformer built from the first and second solenoids can be designed to fit easily into a complete circuit design which most frequently also has rectangular layout geometry.

According to one embodiment, an embedded transformer relies on external coupling through a horizontal side-by-side arrangement, or a vertical arrangement of two solenoids stacked on top of each other. This structure is easy to implement and it is very easy to make more than one primary or secondary winding. Each winding will give the best possible inductor in terms of inductance divided by the series resistance of the inductor, but at the price of a considerably lower coupling between the first and second solenoids than for other arrangements.

As mentioned above, the use of embedded solenoids for the embedded transformer has a number of advantages over other coil geometries. For example, as compared to spiral windings solenoids have the benefit that the current is more evenly distributed over the full width of the traces, whereas the current density of spirals tends to concentrate at one edge of the traces. Therefore the solenoid geometry can achieve a lower series resistance of the coil, in particular for large structures. Furthermore, as mentioned above, solenoids have a rectangular footprint with connectors that are typically arranged at the corners of the structure. From a design flexibility point of view this is preferable over the round structure of a spiral with one connector in the center of the structure. Furthermore the external magnetic field from the solenoid geometry is much weaker than for the spiral geometry, thereby reducing the risk of failing electromagnetic interference requirements. In a further example, as compared to toroidal coil geometries, solenoids have lower series resistance as the viases in the solenoid geometry are distributed equally on both sides of the traces, whereas in the toroidal structure would result in a concentration of the current density in the vertical viases at the inner edge of the toroid. Furthermore, the rectangular footprint of the solenoid geometry is again to be considered an advantage from a circuit designer's point of view as compared to the round shape of toroids, amongst others due to a higher inductance per area, better usage of footprint, and better design compatibility with rectangular geometry circuit layouts. Furthermore, a surprisingly good coupling efficiency can be achieved as compared to e.g. toroidal structures.

Further according to one embodiment of the transformer, the first and second solenoids are wound around a common axis. Thereby an improved coupling between the first and second solenoids is achieved as compared to e.g. a horizontal side-by-side arrangement, or a vertical arrangement of two solenoids stacked on top of each other.

Further according to one embodiment of the transformer, the first and second solenoids at least partially overlap in a longitudinal direction. In the region of the overlap, the coupling between the first and second solenoids is achieved via the internal magnetic field in the region of the overlap. Thereby an improved coupling is achieved as compared to geometries relying on an external coupling. The overlap may be partial or, preferably, over the full lengths of the first and/or second solenoids. The overlap may be achieved in different geometries as further detailed below.

Further according to one embodiment of the transformer, top portions of the first and second solenoids are formed in a common upper conductive layer, and/or bottom portions of the first and second solenoids are formed in a common lower conductive layer. This embodiment has the advantage that it only requires two conductive layers. This is advantageous for a cheap and reliable production of the embedded solenoid transformer, for example in a dual layer PCB.

Advantageously according to one embodiment, the PCB of the transformer is a dual layer PCB.

Further according to one embodiment of the transformer, the first and second solenoids are section-wise interleaved. This embodiment may be considered a hybrid of external and internal coupling between the first and second solenoids, wherein each of the sections are tightly packed coils with an optimum inductance divided by the series resistance. The sections of the first and second solenoids are all aligned on a common axis, thereby sharing a common magnetic path with a good coupling efficiency. This embodiment has the advantage that it allows for providing more than one primary and/or secondary winding in a simple layout.

Further according to one embodiment of the transformer, first sections of the first solenoid alternate with second sections of the second solenoid. The first and second sections share a common magnetic path with a good coupling efficiency.

Further according to one embodiment of the transformer, first sections are single turns and/or second sections are single turns. Thereby, in the region of the overlap, the solenoids are fully interleaved turn by turn. To make space for this interleaving, the axial pitch (distance between adjacent turns in an axial direction) of the respective solenoids needs to be increased. This has the disadvantage that the series resistance for a given inductance of the respective solenoids increases. However, the embodiment has the advantage that a highly efficient coupling between the interleaved solenoids is achieved for a two-layer embedded structure.

Further according to one embodiment of the transformer, the PCB has at least four-layers. This embodiment allows for more complex transformer geometries.

Further according to one embodiment of the transformer, when seen in a cross-sectional plane perpendicular to a longitudinal axis of the solenoids, the second solenoid is arranged inside the first solenoid or, alternatively the first solenoid is arranged inside the second solenoid. This embodiment needs to be implemented in at least a four layer PCB. Despite the inherent reduction of the overlap in cross-sectional area shared by the first and second solenoids (the inside solenoid has inherently a smaller cross-section than the outside/enclosing solenoid), a surprisingly high coupling efficiency is achieved in this embodiment as compared to embodiments implemented in a two-layer PCB configuration, such as even the fully interleaved configuration with alternating single turns.

Furthermore, for a given application this embodiment has a smaller footprint than the above-mentioned embodiments, and magnetic flux is encapsulated better than in e.g. the interleaved structure as the turns of each of the windings is placed as close as possible. This structure can also be preferable for galvanic isolation applications as the isolation is achieved through the layers of the PCB, which typically requires much shorter separation distances than isolation along the surface within the same layer. Preferably, the first solenoid forming the primary side is the inner solenoid, and the second solenoid forming the secondary winding is the outer solenoid enclosing the inner solenoid.

Most preferably, first and second solenoids are arranged concentrically. Thereby an optimum coupling efficiency is achieved.

Further according to some embodiments, the power converter comprises further solenoids coupled to the first solenoid and/or the second solenoid. By adding further windings/solenoids a transformer with multiple input and/or output windings can be formed.

Further according to one embodiment of the invention, the transformer is adapted for operation at a radio frequency in the range 1 MHz-1 GHz; alternatively 10 MHz-500 MHz; further alternatively 30 MHz-300 MHz. The typical dimensions of PCB structures are particularly suited for viable operation of power electronics in the radio frequency range, in particular around and above 1 MHz, and more particular in the VHF-ranges given above. Since at these frequencies the skin depth is around 10 μm (micrometer), the penetration of the current into the conductor is comparable to and even less than the thickness of the conductive layers of a typical PCB. Typical PCBs have conductive layer thicknesses in the range from about 0.1 mm down to about 15 μm. For example, a so-called "1 oz Cu" PCB layer is specified to a copper amount of 1 ounce per sqft, resulting in a copper layer thickness between 30 μm-40 μm, typically about 35 μm. The thickness scales linearly with the copper amount, wherein typical specifications copper layers in a PCB are ½ oz, 0.75 oz, 1 oz, 2 oz, and 3 oz. Due to the small skin depth at high frequencies, the resistance of the solenoid inductors is not significantly affected by the small thickness of typical PCB conductive layers.

Further according to one embodiment of the invention, the transformer has a coupling factor k of above 0.1, preferably above 0.2, preferably above 0.3, preferably above 0.4, preferably above 0.5, more preferably above 0.6, even more preferably above 0.7, and most preferably above 0.8. Transformers intended for transferring power, e.g. an isolating transformer arranged between an input side and an output side, should have a high coupling factor k, such as above 0.6 or preferably above 0.8. On the other hand, coupled inductors intended for synchronizing parallel stages in an AC-circuit may already benefit from much lower coupling factors. In fact, it may be beneficial to provide a circuit with coupled inductors having a specified coupling factor that may be chosen within a broad range of coupling factors. The coupling factor may be chosen e.g. by selecting a layout type and/or tailoring the parameters of a given layout, such as illustrated by the examples in the detailed description below.

Further according to one embodiment, at least one transformer is arranged as an isolating transformer between an input side and an output side.

Further according to one embodiment, at least one transformer is arranged as an autotransformer between an input side and an output side.

Further according to one embodiment, at least one transformer is arranged such that the first solenoid is used as a power carrying inductor in the power converter and the second solenoid is used as a sensing inductor to measure the current through the first inductor. The measured current signal may be for display, presentation at a current monitoring output port, and/or for use as a control signal in the power converter itself, or as a control signal in a system including a power converter according to the present invention. The PCB-embedded transformer configuration allows for a simple, space-saving and cost-effective integration of the current sensing arrangement in the power converter.

Further according to particularly preferred embodiments, the power converter is a resonant DC-DC converter.

Further according to preferred embodiments of the power converter, the switching frequency on the input side is at least 10 MHz, preferably at least 20 MHz, more preferably at least 30 MHz.

According to a further aspect, an inverter is adapted for operation at radio frequencies, preferably in the VHF, and comprises a transformer according to any of the above cited embodiments. The transformer structure may be used as coupled inductors for coupling two complementary gate drive signal of first and second semiconductor switches. Thereby an efficient power inverter is achieved with a small size, which can be produced in an automated manner with high reproducibility and at low cost.

BRIEF DESCRIPTION OF THE DRAWINGS

Preferred embodiments of the invention will be described in more detail in connection with the appended drawings, which show schematically in FIG. 1a-c an embedded solenoid transformer according to a first embodiment, FIG. 2a-c an embedded solenoid transformer according to a second embodiment, FIG. 3a-c an embedded solenoid transformer according to a third embodiment, FIG. 4a-c an embedded solenoid transformer according to a fourth embodiment, FIG. 5 a DC-DC converter circuit comprising an embedded transformer according to a first embodiment, FIG. 6 a class-DE power inverter comprising coupled inductors according to another embodiment, FIG. 7 a DC-DC converter circuit comprising an embedded transformer according to a second embodiment, FIG. 8 a DC-DC converter circuit comprising an embedded transformer according to a third embodiment, FIG. 9 a DC-DC converter circuit comprising an embedded transformer according to a fourth embodiment, FIG. 10 a DC-DC converter circuit comprising an embedded transformer according to a fifth embodiment, and in FIG. 11 a DC-DC converter circuit comprising an embedded transformer according to a sixth embodiment.

DETAILED DESCRIPTION OF PREFERRED EMBODIMENTS

Figure 1A:
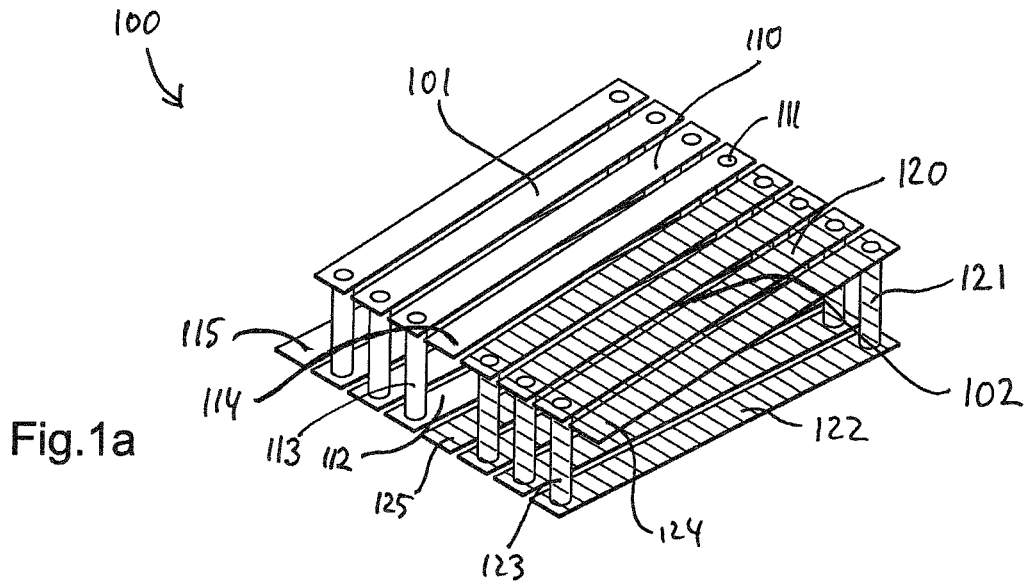
Figure 1B:
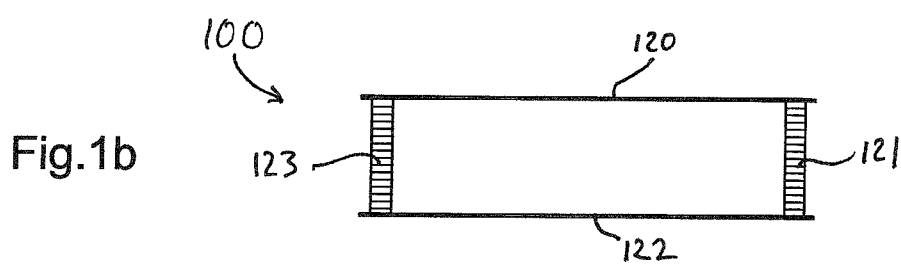
Figure 1C:
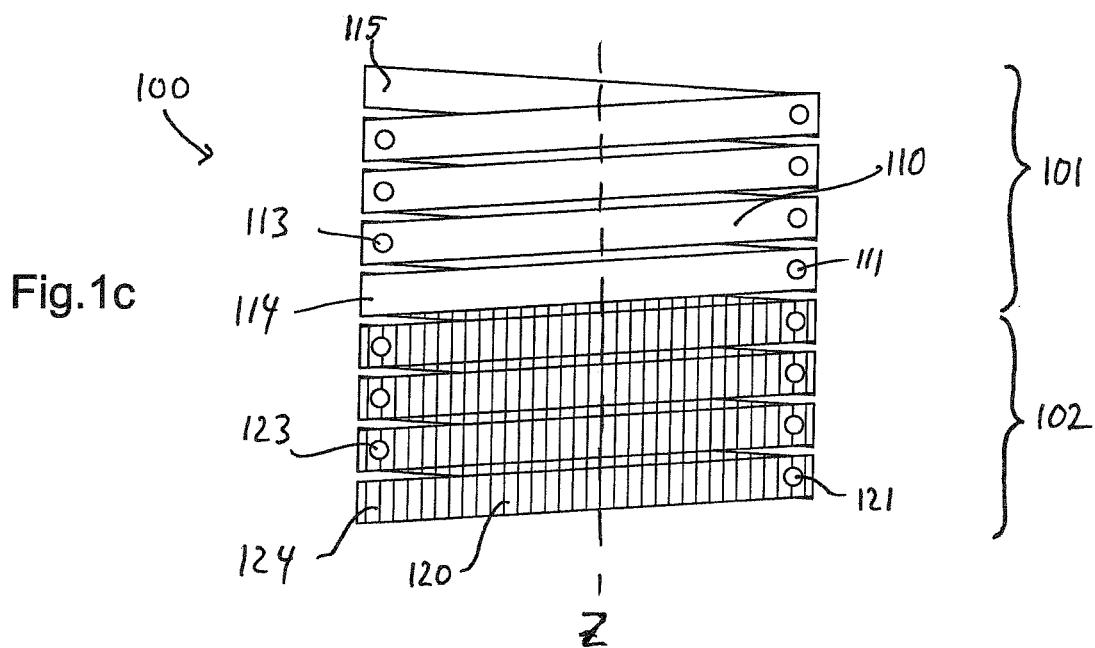
Figure 2A:
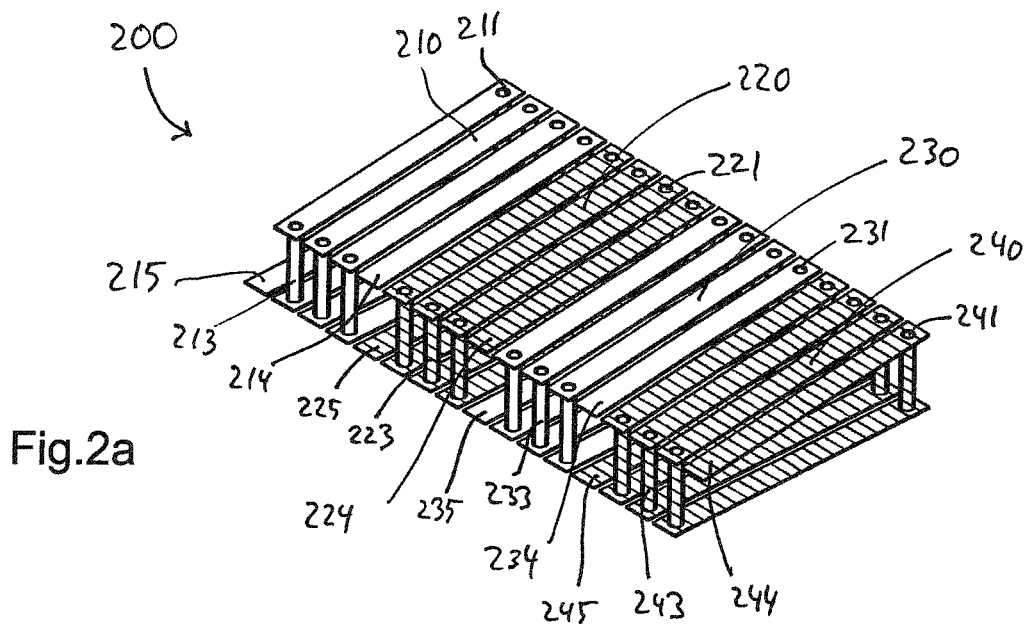
Figure 2B:
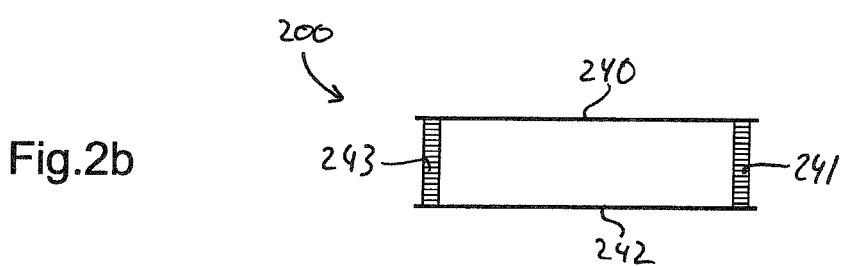
Figure 2C:
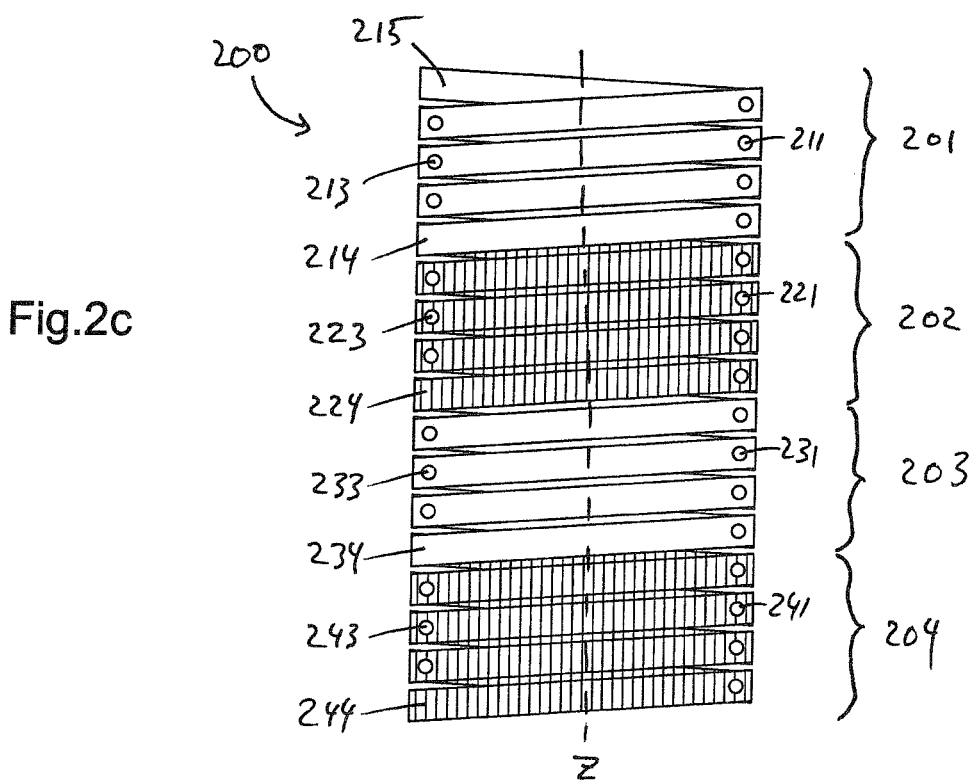
Figure 3A:
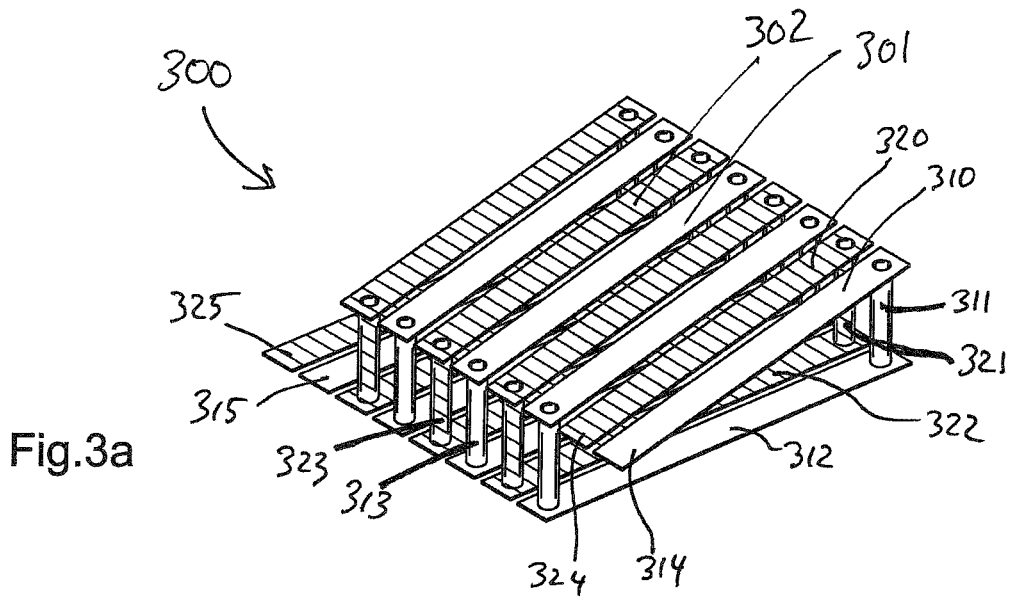
Figure 3B:
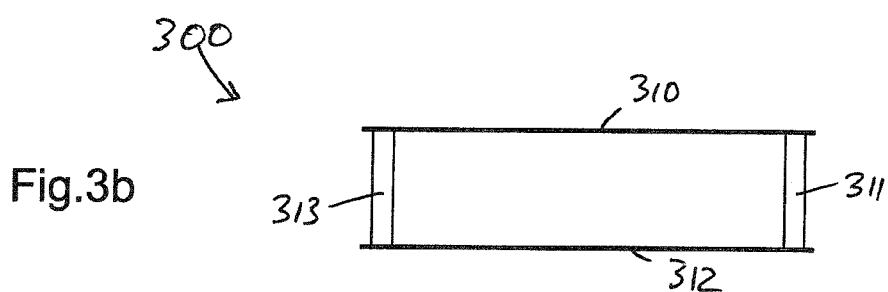
Figure 3C:
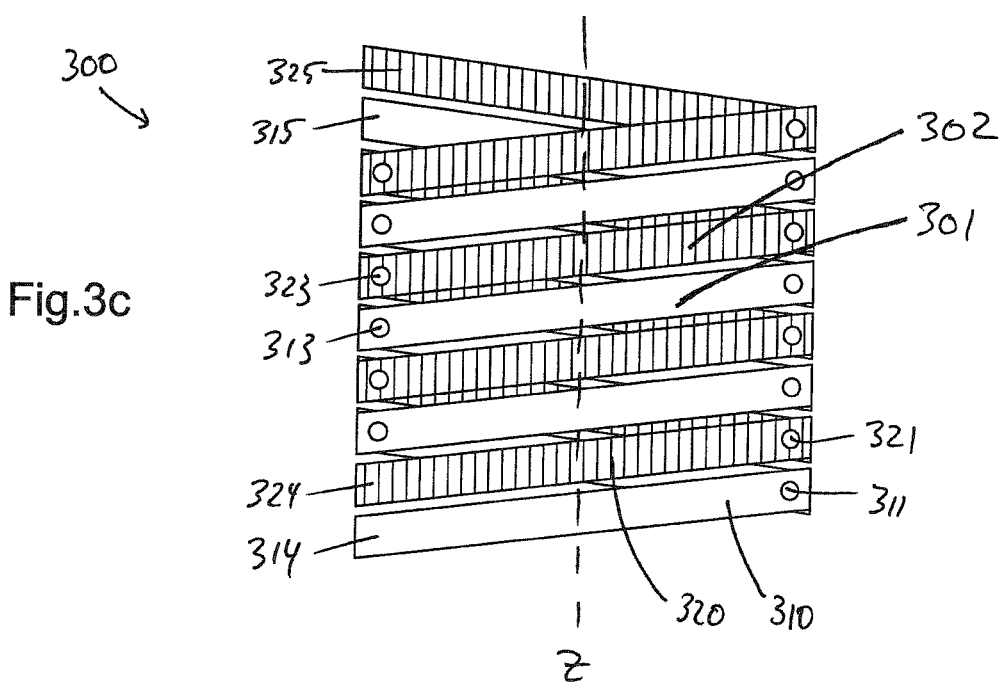
Figure 4A:
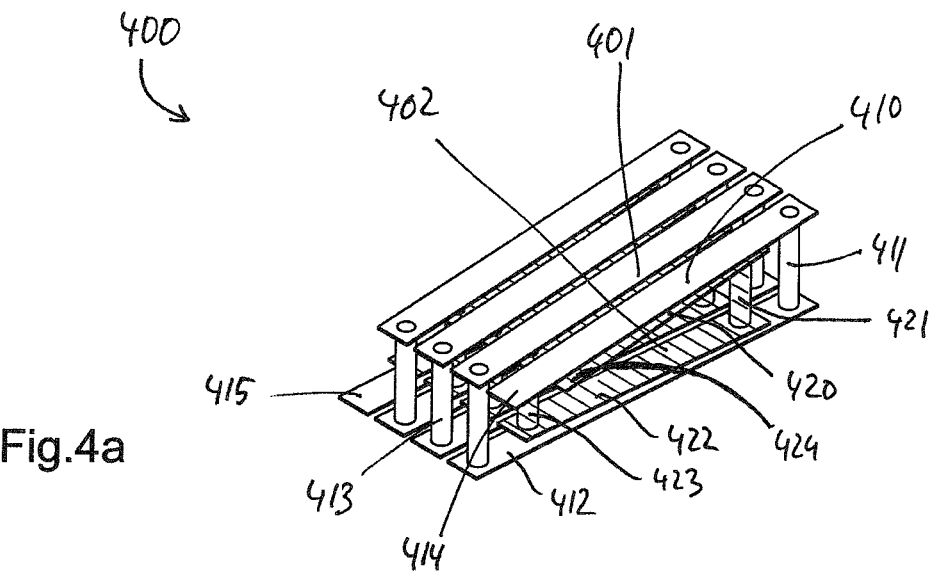

FIGS. 1-4 show different layouts for the implementation of a transformer (x00) embedded in a printed circuit board (PCB), wherein in all the shown embodiments the first solenoids (x01) and the second solenoids (x02) are arranged on a common longitudinal axis Z. In the shown embodiments, the conductive paths of each of the solenoids (x01, x02, 203, 204) is made up of slab-shaped horizontal traces (x10, x12, x20, x22, 230, 232, 240, 242) formed in the conductive layers of a printed circuit board having at least two conductive layers, and vertical vias (x11, x13, x21, x23, 231, 233, 241, 243) made of a conductive material connecting the horizontal traces (x10, x12, x20, x22, 230, 232, 240, 242) in series to form a coil. FIGS. 1-3 show embodiments of PCB embedded solenoid transformers that require a PCB with two conductive layers separated by an isolating layer, such as a dual layer PCB. FIG. 4 shows an embodiment requiring a multilayer PCB with at least four vertically stacked conductive layers separated from each other by isolating layers. Only the conductive paths forming the solenoids are drawn, whereas isolating layers are omitted in the drawings. Respective sub-figures (a) show perspective views of the conductive paths for both the first and second solenoids (x01, x02), sub-figures (b) show an end view as seen in the direction of the longitudinal axis Z, and sub-figures (c) show a top elevation view of the solenoid arrangements (x00).

FIG. 1 shows a first embodiment of a PCB embedded transformer 100 in an end-to-end configuration with a first solenoid 101 having four turns wound around a longitudinal axis Z, each turn having a top portion 110, followed by a downward via 111, a bottom portion 112, and an upward via 113. The first solenoid 101 has first connection terminals 114, 115 for connection to further circuitry. In direct extension to the first solenoid 101, a second solenoid 102 is formed by four turns wound around the same longitudinal axis Z, each turn having a top portion 120, followed by a downward via 121, a bottom portion 122, and an upward via 123. The second solenoid 102 has connection terminals 124, 125. The end-to end configuration is essentially a solenoid, which has been broken up in two solenoids by omitting the vertical connection between the contact terminals 114 and 125.

FIG. 2 shows a second embodiment of a PCB embedded transformer 200 in a section-wise interleaved configuration. The arrangement comprises four identical sections 210, 220, 230, 240 of four turns each, wherein the four sections 210, 220, 230, 240 are aligned along a common longitudinal axis Z. The turns of the solenoid sections 210, 220, 230, 240 are formed in the same way by respective horizontal top and bottom portions connected in series through vertical vias as described above, and each of the sections 210, 220, 230, 240 has respective connection terminals 214, 215, 224, 225, 234, 235, 244, 245. The first and third sections 210, 230 form a primary side of the transformer 200. The first and third sections 210, 230 may be operated as separate first solenoids with four turns each or they may be connected in series for operation as one first solenoid with eight turns. Accordingly, the second and fourth sections 220, 240 form the secondary side of the transformer 200 and may be operated as separate second solenoids or as one second solenoid.

FIG. 3 shows a third embodiment of a PCB embedded transformer 300 with two solenoids in a 1:1 interleaved configuration. The transformer 300 has a first solenoid 301 with turns formed by top portions 310, bottom portions 312, and vertical viases 311, 313 connecting alternating top and bottom portions 310, 312 in series to provide a coil as described above. The first solenoid 301 has first connection terminals 314, 315 for connection to further circuitry. A second solenoid 302 is formed accordingly from top portions 320, bottom portions 322, and vertical viases 321, 323. The second solenoid 302 has second connection terminals 324, 325 for connection to further circuitry. Both solenoids 301, 302 are wound around a common longitudinal axis Z. However, in contrast to the above-described embodiments, the pitch of the first and second solenoids (i.e. the distance between adjacent turns within the same solenoid) is doubled to allow for an alternating arrangement of single turns from the first solenoid 301 and from the second solenoid 302. The increased pitch tends to produce a more leaky solenoid, and somewhat increases the length and thus the resistance of the solenoids with the same number of turns. However, the 1:1 interleaved configuration has the benefit of a considerably increased coupling between the first and second solenoids as compared to other two-layer designs, such as the embodiments mentioned above.

Figure 4B:
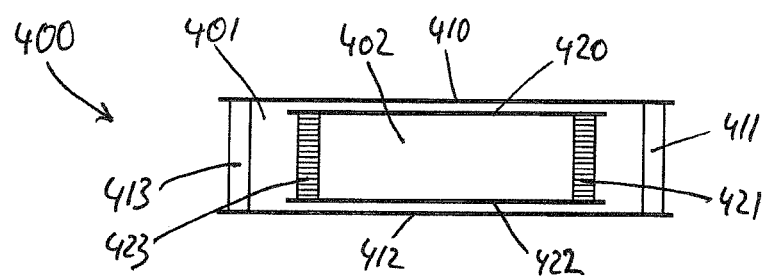
Figure 4C:
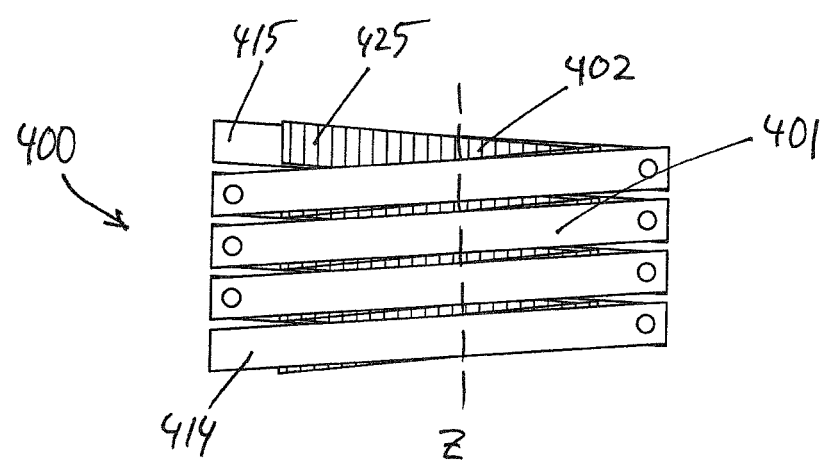

FIG. 4 shows a fourth embodiment of a PCB embedded transformer 400, wherein a first solenoid 401 encloses a second solenoid 402. In the shown embodiment, the first and second solenoids are wound around the same longitudinal axis Z in a preferred concentric arrangement. The transformer 400 requires a multilayer PCB with four conductive layers as best seen in FIG. 4b. The turns of the outer first solenoid 401 are formed by top portions 410 in an uppermost conductive layer, bottom portions 412 in a lowermost conductive layer and vertical vias 411, 413 connecting alternating top and bottom portions 410, 412 in series. The turns of the inner, second solenoid are formed by top portions 420 in an upper inner conductive layer of the multilayer PCB, bottom portions 422 in a lower inner conductive layer of the multilayer PCB, and vertical vias 421, 423 connecting the top and bottom portions 420, 422 in series. The transformer has primary side connection terminals 414, 415 for connecting the outer, first solenoid 401 to further circuitry, and secondary side connection terminals 424, 425 for connecting the inner, second solenoid 402 to further circuitry. Note, that the role of the inner and outer solenoids may be interchanged, such that the inner solenoid forms the primary side of the transformer 400, and the outer solenoid forms the secondary side of the transformer 400.

Figure 12:
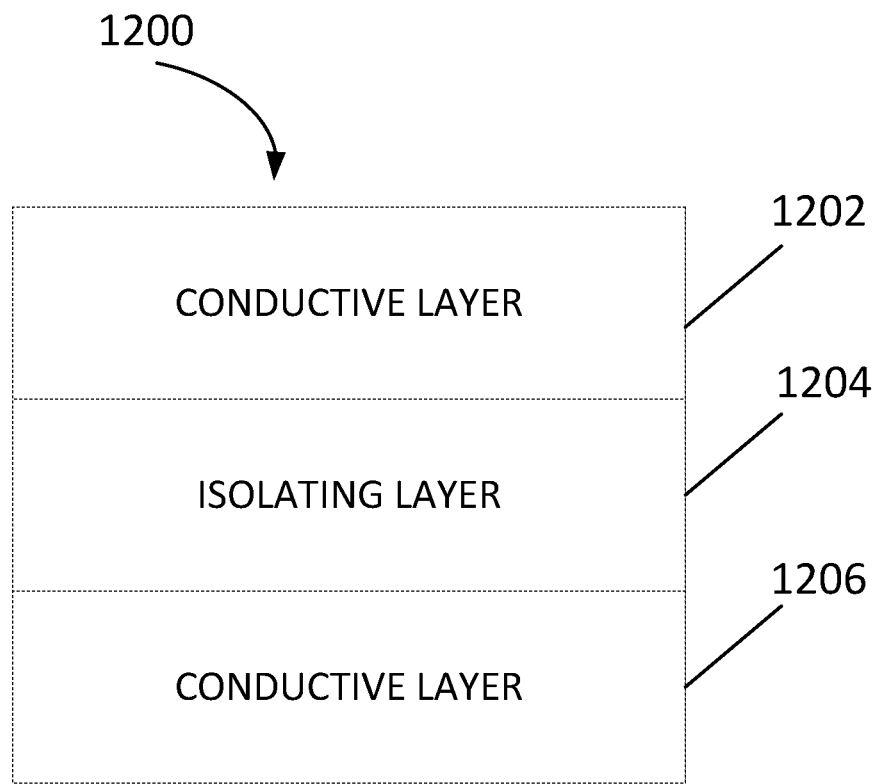
FIG. 12 is a schematic view of an embodiment of an embedded solenoid transformer.

FIG. 12 shows a schematic view of an embodiment of an embedded solenoid transformer 1200. The transformer 1200 includes a first conductive layer 1202, a second conductive layer 1206, and an isolating layer 1204 separating the first conductive layer 1202 and the second conductive layer 1206.

Figure 5:
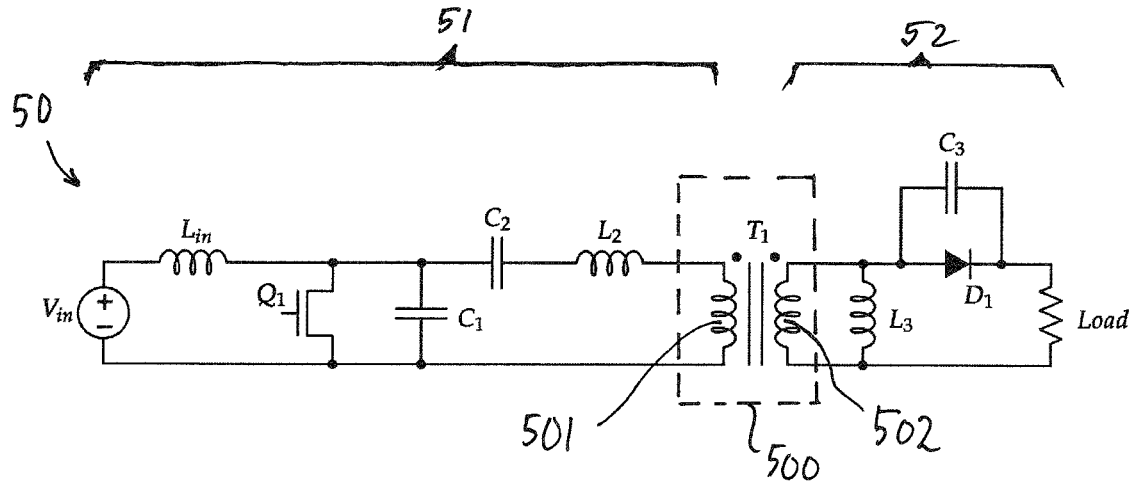
Figure 6:
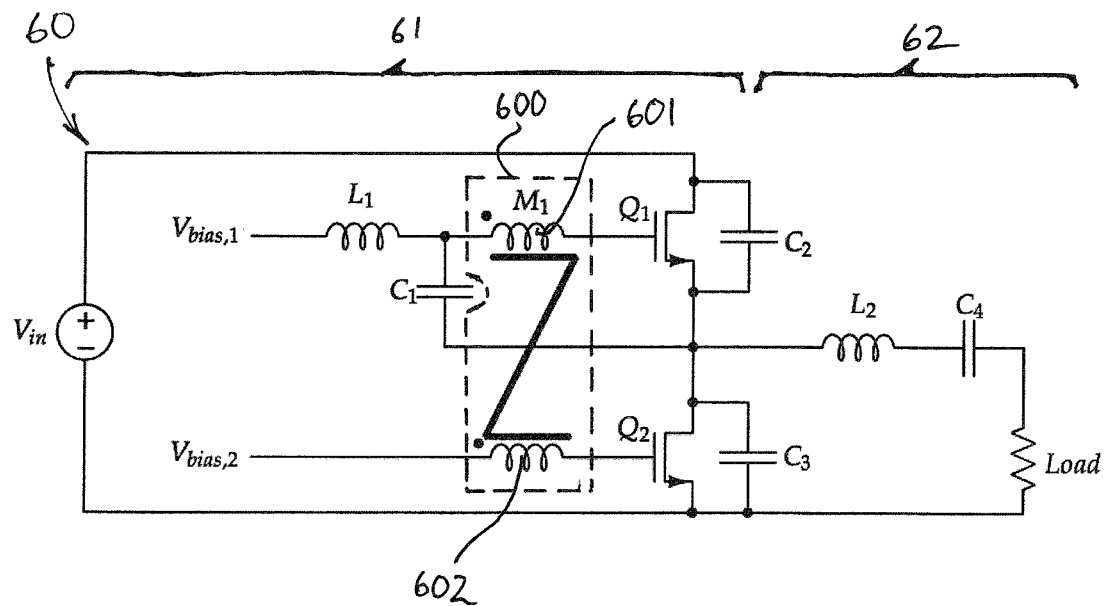

FIGS. 5 and 6 give examples of advantageous uses of PCB embedded solenoid transformers in power converters operating at radio frequencies, preferably in the VHF range.

FIG. 5 shows a class-E isolated resonant DC-DC converter 50, which may be adapted for radio frequency operation, preferably in the VHF. The converter 50 receives a DC-input voltage Vin on an input side 51, and provides a DC-output voltage to a load on an output side 52. The input side 51 may comprise a semiconductor switch, such as a MOSFET, with a control terminal Q1 that may be driven by an external oscillator or e.g. a self-oscillating gate drive circuit as described in the co-pending International Patent Application PCT/EP2013/072548, and a resonant tank formed by capacitance C2 and L2. The output side 52 may comprise a class-E rectifier, here represented schematically by diode D1, capacitance C3, and inductance L3. Input side 51 and output side are coupled by an isolating transformer T1. Advantageously, the transformer T1 is a PCB embedded solenoid transformer 500 with a primary winding 501 and a secondary winding 502 inductively coupled to the primary winding 501, wherein the coupling designated by the double line may be a coreless coupling.

FIG. 6 shows a self-oscillating class-DE power inverter 60 adapted for radio frequency operation, preferably in the VHF. The inverter 60 receives a DC-input voltage Vin at input terminals of an input stage 61, and provides an AC-output voltage in the radio frequency range, e.g. in the VHF, to a load at output terminals of an output stage 62. The input stage 61 may comprise semiconductor switches with control terminals Q1, Q2 and respective drain-source capacitors C2, C3 in a half-bridge configuration, wherein the semiconductor switches are controlled to oscillate with opposite phase. As shown schematically in FIG. 6, the oscillation may be driven by a self-oscillating circuit as described in the co-pending International Patent Application PCT/EP2013/072548, here illustrated by inductance L1 and C1, in combination with coupled inductors M1 locking the control signals acting on the semiconductor switches Q1, Q2 to opposite phase. Advantageously, the coupled inductors M1 are a PCB embedded solenoid structure 600 with a first winding 601 and a second winding 602 inductively coupled to the first winding 601, wherein the coupling designated by the Z-shaped thick line may be a coreless coupling.

FIGS. 7-11 show further embodiments of resonant DC-DC converters comprising an embedded solenoid transformer coupling an input side of the converter to an output side. In all embodiments, the embedded transformers are made up of embedded PCB solenoid inductors that are coupled to form an embedded solenoid transformer as described above. In FIGS. 7-11 coupling is indicated by a double line, wherein the coupling may be a coreless coupling.

Figure 7:
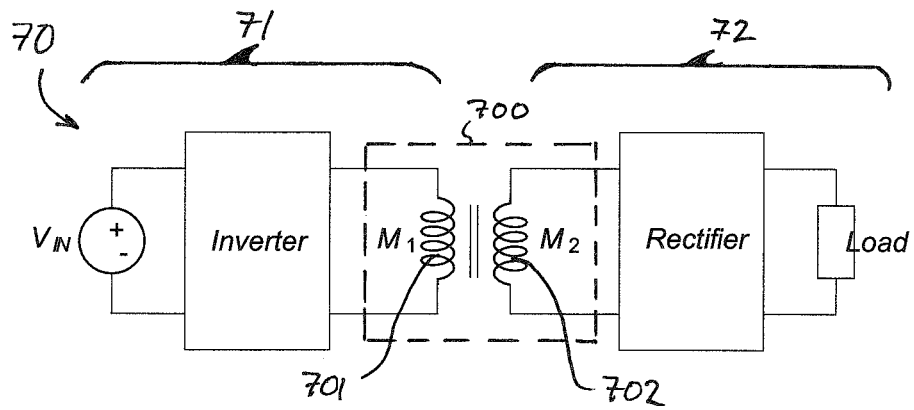

FIG. 7 shows a generic schematic of a resonant DC-DC converter 70 with an input side (inverter) 71 coupled to an output side (rectifier) 72 through an embedded isolating transformer 700, wherein the embedded printed circuit board solenoid inductors 701, 702 are coupled to be used as the transformer 700 between the input side inverter 71 and the output side rectifier 72.

Figure 8:
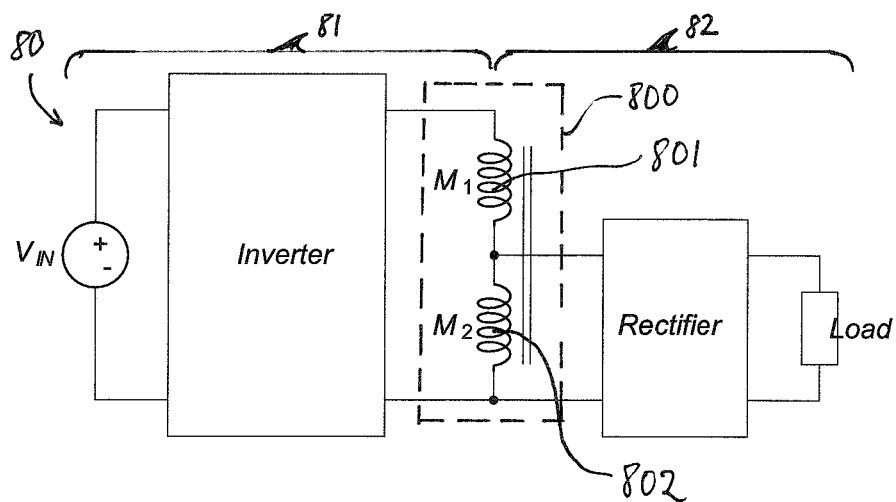

FIG. 8 shows a generic schematic of a resonant DC-DC converter 80 with an input side inverter 81 coupled to an output side rectifier 82 through an embedded autotransformer 800. The autotransformer 800 is formed by coupled embedded printed circuit board solenoid inductors 801, 802.

In applications where a high step ratio is required, but isolation is not, this configuration gives several advantages. The autotransformer 800 can be used to transform the impedance of the output side rectifier 82 to the desired output impedance for the input side inverter 81. This is particularly desirable in resonant converters as they are very dependent on the input and output impedances.

Figure 9:
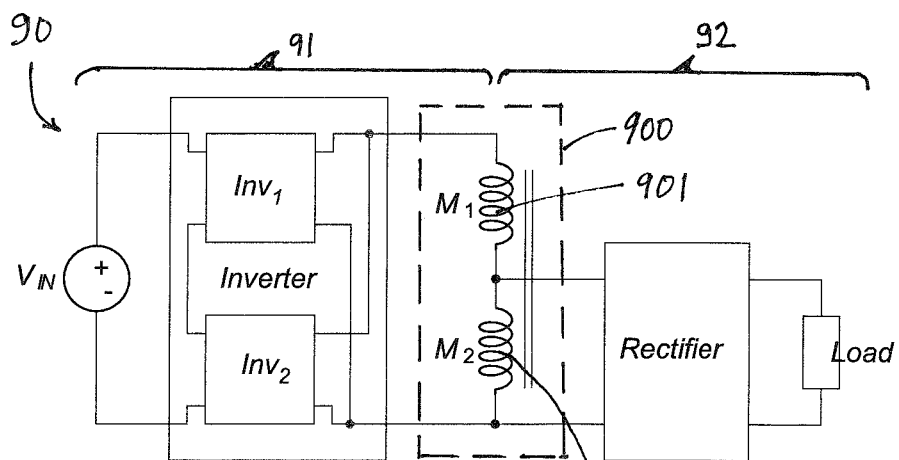

FIG. 9 shows schematically an embodiment of a resonant DC-DC converter 90 with an input side inverter 91 coupled to an output side rectifier 92 through an embedded autotransformer 900. The resonant DC-DC converter 90 of FIG. 9 differs from the resonant DC-DC converter 80 of FIG. 8 in that the input side inverter 91 comprises a plurality of smaller inverters Inv1, Inv2. In the particular embodiment shown, the input side inverter 91 has two smaller inverters Inv1, Inv2 coupled with serial input and parallel output, a configuration also referred to as "SIPO". The input side inverter 91 can also comprise an even higher number of smaller inverters. Furthermore, the plurality of smaller inverters may also be arranged with other combinations of parallel and serial input and output. The output side rectifier 92 may comprise multiple smaller rectifiers in the same way (not shown). Galvanic isolation in the sub-block (i.e. the smaller inverters and/or the smaller rectifiers) is a requirement if serial input or output is to be used. Generally, serial connection is desirable for high voltages and parallel connection is desirable for high currents.

Figure 10:
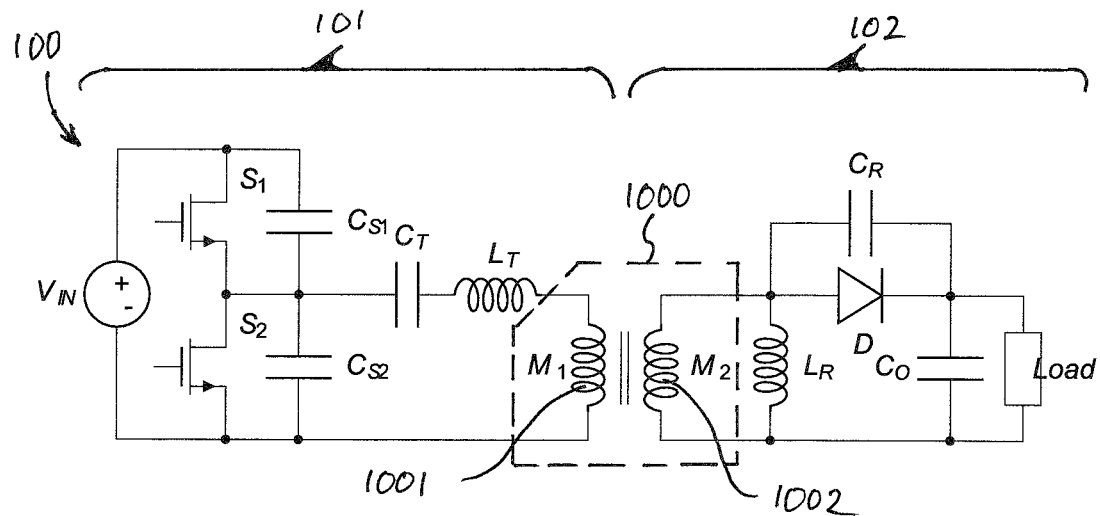

FIG. 10 shows schematically an embodiment of a resonant DC-DC converter 100 with an input side inverter 101 and an output side rectifier 102 coupled together through an embedded isolating transformer 1000. The isolating transformer is formed by coupled embedded printed circuit board solenoid inductors 1001, 1002. In this particular embodiment of the resonant DC-DC converter 100, the input side inverter 101 comprises a class DE inverter and the output side comprises a class E rectifier 102. This topology is especially suitable for applications with high input voltage and low output voltages. This is due to the half bridge configuration on the input side 101, which limits the peak voltage across the two switches S1, S2 to the input voltage, and the single diode rectifier on the output side 102, which minimizes the loss in the rectifier due to forward conduction loss in the diode. For example, this may be useful for a USB charging device, which needs to convert an input with a voltage of 110V/230V from a rectified mains input to an output of 5V, and which has to be galvanic isolated to properly protect a user of the charging device.

Figure 11:
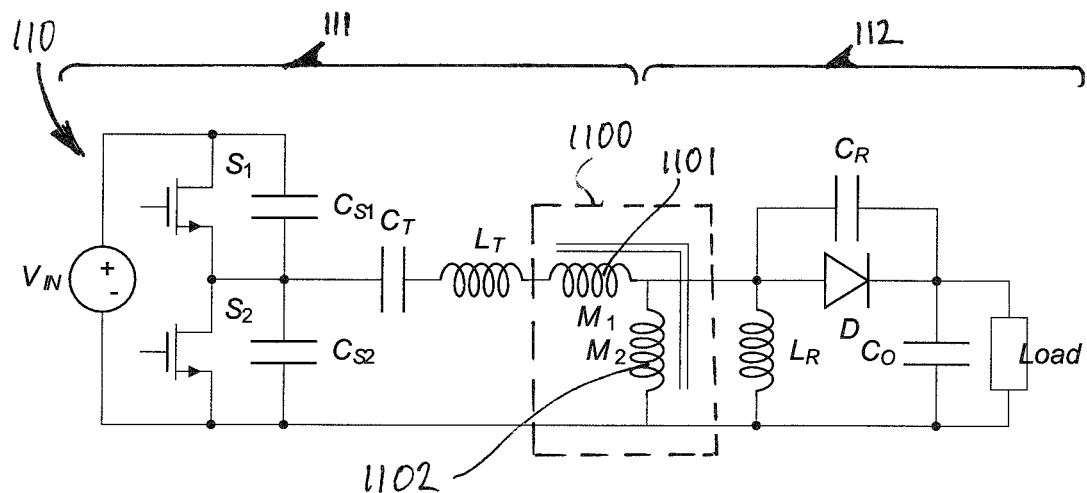

FIG. 11 shows schematically an embodiment of a resonant DC-DC converter 110 with an input side inverter 111 and an output side rectifier 112. As in the embodiment of FIG. 10, the input side inverter 111 comprises a class DE inverter and the output side rectifier comprises a class E rectifier. The embodiment 110 of FIG. 11 differs from the embodiment 100 of FIG. 10 in that the input side inverter 111 and the output side rectifier 112 are coupled together through an embedded autotransformer 1100. The autotransformer 1100 is formed by coupled embedded printed circuit board solenoid inductors 1101, 1102 as also shown in FIG. 8 and FIG. 9.

In applications where galvanic isolation is not a requirement it is generally more desirable to use the coupled inductors in an autotransformer configuration. Furthermore, for applications with low input voltages, inverters with just a low side switch, like switch Q1 in the input side inverter 51 shown in FIG. 5, are typically more desirable, for example in battery driven applications like automotive, portable devices, etc. Furthermore, for applications with high output voltage, an output side rectifier comprising a half bridge rectifier is preferable.

EXAMPLES

A transformer can be described by an inductance matrix.

$$\begin{bmatrix} v_p(t) \\ v_s(t) \end{bmatrix} = \begin{bmatrix} L_{11} & L_{12} \\ L_{21} & L_{22} \end{bmatrix} \frac{d}{dt} \begin{bmatrix} i_p(t) \\ i_s(t) \end{bmatrix},$$

wherein v(t) and i(t) refer to time-dependent voltage and current, respectively, and indices p and s refer to primary-side and secondary-side, respectively.

An interpretation of the inductance matrix yields transformer parameters for characterizing a given transformer. The diagonal elements L11 and L22 of the inductance matrix are the self-inductances for each winding, and the off-diagonal elements L12 and L21 are the mutual inductances as determined by the mutual flux. Since the transformer is a passive device L12 and L21 are equal. The coupling factor k is given by $$k = \frac{L_{12}}{\sqrt{L_{11} L_{22}}}.$$

In the following, examples are given for different types of layouts of PCB embedded transformers as described above with reference to FIGS. 1-4, wherein the number of turns of the transformers of the below examples may vary with respect to the transformers shown in the figures. The actual numbers of turns and corresponding geometry data of the measured transformers are given in each of the examples below. The geometry data comprise values for the width w of the transformer and/or first and second solenoids. These widths w are given as the distance between the respective vertical centers of the vias in a horizontal direction transverse to the longitudinal direction. The geometry data further comprise the overall lengths l of the transformers and/or the first and second solenoids in the longitudinal direction. The respective heights h of the transformers and/or first and second solenoids are determined by the PCB layer stack used for producing the respective embedded solenoid transformer. Depending on the transformer layout, the structures have been implemented in dual-layer PCB or in a four-layer PCB as also indicated in the examples below. The dual-layer PCB stack comprises an isolating core layer with a thickness of about 1600 µm carrying an upper conductive layer made of copper with a thickness of 35 µm on one side, and a corresponding lower conductive layer made of copper with a thickness of 35 µm on the opposite side. The four-layer PCB stack has a total thickness of about 1600 µm and comprises an isolating inner layer with a thickness of 710 µm carrying inner upper and lower copper layers on either side. The inner copper layers have a thickness of 35 µm each. Each of the inner copper layers is covered by a respective outer isolating layer of 7628 prepreg with a thickness of 360 µm each. Finally, each of the outer isolating layers carries an outer conductive layer made of copper foil with a thickness of 18 µm.

The examples are transformers designed for operation in the VHF frequency range, and the different transformers are characterized by measured values for the above-mentioned transformer parameters L11, L22, L12, L21, k. Measurements of the transformer parameters L11, L22, L12, L21, k have been obtained using a network analyzer, wherein all measurements have been made in the frequency range 1 MHz-1.8 GHz. Based on the measurement results a frequency range of operation is specified, for which the obtained transformer values are considered valid. Since the transformer is a passive device, L12 equals L21. Therefore only values for L12 are given below.

Example 1

Example 1 refers to an end-to-end layout embedded in a dual layer PCB as illustrated above with respect to FIGS. 1a-c and in the following implementation:

|  | $1^{st}$ solenoid | $2^{nd}$ solenoid | transformer |
|---|---|---|---|
| Number of turns | 5 | 5 |  |
| Width w/mm | 10 | 10 | 10 |
| Length l/mm | 10 | 10 | 20 |
| Height h/mm | 1.6 | 1.6 | 1.6 |
| Trace width t/mm | 1.8 | 1.8 | 1.8 |

The following transformer parameters have been measured for this implementation:

| L11/nH | L12/nH | L22/nH | K |
|---|---|---|---|
| 41.00 | 3.22 | 39.45 | 0.08 |

The values of the transformer parameters are valid for operation in the frequency range from 100 MHz-850 MHz.

Example 2

Example 2 refers to section-wise interleaved layout embedded in a dual layer PCB as illustrated above with respect to FIGS. 2a-c and in the following implementation with one first solenoid and one second solenoid arranged on a common longitudinal axis. Both solenoids have five turns distributed over two sections, with two and three turns, respectively. When seen along the longitudinal direction, starting from one end of the transformer, two turns of the first solenoid are followed by three turns of the second solenoid, which is followed by three turns of the first solenoid, which is again followed by two turns of the second solenoid.

|  | $1^{st}$ solenoid | $2^{nd}$ solenoid | transformer |
|---|---|---|---|
| Number of turns | 5 | 5 |  |
| Number of sections | 2 | 2 |  |
| Number of turns per section | 2/3 | 2/3 |  |
| Width w/mm | 10 | 10 | 10 |
| Length l/mm |  |  | 20 |
| Height h/mm | 1.6 | 1.6 | 1.6 |
| Trace width t/mm | 1.8 | 1.8 | 1.8 |

The following transformer parameters have been measured for this implementation:

| L11/nH | L12/nH | L22/nH | k |
|---|---|---|---|
| 40.95 | 10.52 | 38.81 | 0.26 |

The values of the transformer parameters are valid for operation in the frequency range from 1 MHz-900 MHz.

Example 3

Example 3 refers to an interleaved layout, wherein single turns of a first solenoid alternate with single turns of a second solenoid. The layout is embedded in a dual layer PCB as illustrated above with respect to FIGS. 3a-c and in the following implementation:

|  | 1st solenoid | 2nd solenoid | transformer |
| --- | --- | --- | --- |
| Number of turns | 10 | 10 |  |
| Width w/mm | 10 | 10 | 10 |
| Length l/mm |  |  | 16.4 |
| Height h/mm | 1.6 | 1.6 | 1.6 |
| Trace width t/mm | 0.6 | 0.6 | 0.6 |

The following transformer parameters have been measured for this implementation:

| L11/nH | L12/nH | L22/nH | k |
| --- | --- | --- | --- |
| 159.07 | 94.03 | 162.89 | 0.59 |

The values of the transformer parameters are valid for operation in the frequency range from 1 MHz-650 MHz.

Example 4

Example 4 refers to a layout, wherein a first solenoid is enclosed inside a second solenoid. The layout is embedded in a four-layer PCB as illustrated above with respect to FIGS. 4a-c and in the following implementation:

|  | 1st solenoid | 2nd solenoid | transformer |
| --- | --- | --- | --- |
| Number of turns | 19 | 19 |  |
| Width w/mm | 23.4 | 25 | 25 |
| Length l/mm | 11 | 11 | 11 |
| Height h/mm | 0.71 | 1.6 | 1.6 |
| Trace width t/mm | 0.4 | 0.4 | 0.4 |

The following transformer parameters have been measured for this implementation:

| L11/nH | L12/nH | L22/nH | k |
| --- | --- | --- | --- |
| 1154.33 | 1104.82 | 1506.57 | 0.84 |

The values of the transformer parameters are valid for operation in the frequency range from 1 MHz-25 MHz.

The invention claimed is:

1. A resonant power converter for operation in the radio frequency range comprising at least one transformer, wherein the at least one transformer comprises:
a printed circuit board defining a horizontal plane, the printed circuit board comprising at least two horizontal conductive layers separated by an isolating layer, said at least two horizontal conductive layers each comprising a copper layer disposed on the isolating layer, each copper layer having a thickness between 35 μm and 105 μm, the thickness of each copper layer being linearly proportional to an amount of copper forming each copper layer of 1 oz per square foot to 3 oz per square foot;
a first embedded solenoid forming a primary winding of the transformer and
a second embedded solenoid being arranged parallel to the first solenoid and forming a secondary winding of the transformer,
wherein the first and second embedded solenoids are formed in the at least two horizontal conductive layers of the printed circuit board in a series of copper traces having a trace width dimension in the range of 0.4 mm to 1.8 mm wide, wherein each full turn of an embedded solenoid has a horizontal top portion formed in an upper conductive layer of a first of the at least two horizontal conductive layers, a horizontal bottom portion formed in a lower conductive layer of a second of the at least two horizontal conductive layers, and two vertical side portions formed by vias extending between the upper and the lower conducting layers.

2. The resonant power converter according to claim 1, wherein the transformer is a coreless transformer.

3. The resonant power converter according to claim 1, wherein the first and second solenoids are embedded on the same PCB.

4. The resonant power converter according to claim 1, wherein the first and second solenoids are wound around a common axis.

5. The resonant power converter according to claim 4, wherein the first and second solenoids at least partially overlap in a longitudinal direction.

6. The resonant power converter according to claim 1, wherein top portions of the first and second solenoids are formed in a common upper conductive layer, and/or bottom portions of the first and second solenoids are formed in a common lower conductive layer.

7. The resonant power converter according to claim 6, wherein the first and second solenoids are section-wise interleaved.

8. The resonant power converter according to claim 7, wherein first sections of the first solenoid alternate with second sections of the second solenoid.

9. The resonant power converter according to claim 6, wherein first sections are single turns and/or second sections are single turns.

10. The resonant power converter according to claim 1, wherein the PCB has at least four-layers.

11. The resonant power converter according to claim 10, wherein when seen in a cross-sectional plane perpendicular to a longitudinal axis of the solenoids, the second solenoid is arranged inside the first solenoid or, alternatively the first solenoid is arranged inside the second solenoid.

12. The resonant power converter according to claim 1, wherein the transformer comprises further solenoids coupled to the first solenoid and/or the second solenoid.

13. The resonant power converter according to claim 1, wherein the transformer is configured to operate at a radio frequency in the range of 1 MHz-1 GHz, 10 MHz-500 MHz, or 30 MHz-300 MHz.

14. The resonant power converter according to claim 1, wherein the transformer has a coupling factor k that is above 0.1, above 0.3, above 0.4, above 0.5, above 0.6, or above 0.8.

15. The resonant power converter according to claim 1, wherein at least one transformer is configured to be an isolating transformer between an input side and an output side.

16. The resonant power converter according to claim 1, wherein at least one transformer is configured to be an autotransformer between an input side and an output side.

17. The resonant power converter according to claim 1, wherein at least one transformer is configured such that the first solenoid is a power carrying inductor in the power converter and the second solenoid is a sensing inductor that measures the current through the first inductor.

18. The resonant power converter according to claim 1, wherein the resonant power converter is a resonant DC-DC converter.

19. The resonant power converter according to claim 1, wherein a switching frequency on the input side is at least 10 MHz, at least 20 MHz, or at least 30 MHz.

20. The resonant power converter according to claim 1, wherein the power converter is an inverter.

* * * * *